United States Patent
Nomura

(10) Patent No.: US 8,537,162 B2
(45) Date of Patent: Sep. 17, 2013

(54) MAP DATA UPDATE APPARATUS

(75) Inventor: Toshio Nomura, Nagoya (JP)

(73) Assignee: DENSO CORPORATION, Kariya (JP)

(*) Notice: Subject to any disclaimer, the term of this patent is extended or adjusted under 35 U.S.C. 154(b) by 821 days.

(21) Appl. No.: 12/656,651

(22) Filed: Feb. 12, 2010

(65) Prior Publication Data

US 2010/0225651 A1    Sep. 9, 2010

(30) Foreign Application Priority Data

Mar. 5, 2009  (JP) .................................. 2009-51824

(51) Int. Cl.
  *G06T 11/20*  (2006.01)
  *G08G 1/123*  (2006.01)

(52) U.S. Cl.
  USPC .... 345/441; 340/988; 340/995.1; 340/995.14

(58) Field of Classification Search
  USPC .................. 345/441; 340/988–996
  See application file for complete search history.

(56) References Cited

U.S. PATENT DOCUMENTS 6,922,157 B2    7/2005  Kimura

FOREIGN PATENT DOCUMENTS

| JP | A-09-145383   | 6/1997 |
| JP | A-2002-054934 | 2/2002 |
| JP | A-2002-279437 | 9/2002 |
| JP | A-2004-212456 | 7/2004 |

OTHER PUBLICATIONS

Office Action mailed on Apr. 5, 2011 issued in the corresponding Japanese Patent Application No. 2009-051824 (English translation enclosed).

*Primary Examiner* — Ke Xiao
*Assistant Examiner* — Jed-Justin Imperial
(74) *Attorney, Agent, or Firm* — Posz Law Group, PLC

(57) ABSTRACT

In a vehicular navigation apparatus, when map data of a unit area is updated, it is determined whether a border node contained in an adjoining unit area which adjoins the updated unit area is separated from an opponent border node contained in the updated unit area. The positions of the border node and the opponent border node are moved to target points so as to accord with each other, thereby reducing a possibility to worsen an appearance of a map as a result of the update of the unit area of the map data.

11 Claims, 5 Drawing Sheets

*EXECUTED BY CONTROL CIRCUIT

*EXECUTED BY CONTROL CIRCUIT

*EXECUTED BY CONTROL CIRCUIT

MAP DATA UPDATE APPARATUS

CROSS REFERENCE TO RELATED APPLICATION

The present application is based on and incorporates herein by reference Japanese Patent Application No. 2009-51824 filed on Mar. 5, 2009.

FIELD OF THE INVENTION

The present invention relates to a map data update apparatus.

BACKGROUND OF THE INVENTION

[Patent document 1] JP 2002-54934 A

There is known a technology to update map data in a map display apparatus which displays a map using map data (for example, refer to Patent document 1).

Methods of update of map data may include, for instance, a method of updating the whole map data stored in the map display apparatus, a method of updating only a difference of a new version of the map from the previous version of the map, and a method of updating an area covering a specific geographical area range in the map data.

In order to realize the update of the area, the map data may be divided into several unit areas as update units. In addition, the method of dividing the map data into several unit areas requires a consideration about treatment of roads or planimetric features bridging over a border of two unit areas.

The treatment of roads is explained as follows. A road bridging over a unit areas border is divided into the two links at the unit areas border. With respect to the two links posterior to such division, a first border node existing on the unit areas border is provided as a node connected to one end point of one link, whereas a second border node existing on the unit areas border is provided as a node connected to one end point of the other link. In such cases, the first border node and second border node belong to mutually different unit areas, but have the identical single position.

In this regard, however, when the first border node belonging to one unit area and the second border node belonging to the other unit area are provided as a single node existing on the single position of the border of the adjoining unit areas, the following disadvantage may occur in the case of an area update.

That is, when an update of the unit area which the second border node belongs to is executed, the position of the second border node may change. If changing, a position gap or separation resultantly arises in between the positions of the first border node and the second border node.

When such a position separation arises, there is a possibility that the road is viewed as if being disconnected at the position separation in displaying a map based on the map data. That is, the appearance of the map may worsen.

In addition, the treatment of the planimetric feature is as follows. A planimetric feature bridging over the border between the unit areas is divided at the border. The first border planimetric feature belonging to one unit area and the second border planimetric feature belonging to the other unit area are generated. The first planimetric feature occupies the portion of one unit area contained in the original planimetric feature, whereas the second planimetric feature occupies the portion of the other unit area contained in the original planimetric feature. At this time, the inside of the polygon which is formed by connecting the feature points of the first border planimetric feature is occupied by the first border planimetric feature. In contrast, the inside of the polygon which is formed by connecting the feature points of the second border planimetric feature is occupied by the second border planimetric feature.

However, when the planimetric feature which occupies the geographical area range over the unit areas border is thus divided into two border planimetric features, the following disadvantage may occur in the case of the area update. That is, when updating of one unit area, the occupied area range of the first border planimetric feature and the occupied area range of the second border planimetric feature separate from each other at the unit areas border. As a result, the configuration appearing when the occupied area range of the original planimetric feature is displayed on the map may different from the actual one, thereby possibly causing distortion. That is, the appearance of the map may worsen.

SUMMARY OF THE INVENTION

The present invention takes the above issues into consideration. It is an object of the present invention to reduce a possibility to worsen an appearance of a map as a result of an update of an area in map data.

To achieve the above object, according to an example of the present invention, a map update apparatus is provided as follows. An image display device is configured. A storage medium is configured to store map data that is classified into several unit areas, which include a first unit area and a second unit area adjoining the first unit area, the first unit area containing a first border node, the second unit area containing a second border node, the first border node and the second border node having an identical position on a unit areas border that is a border between the first unit area and the second unit area. A control circuit is configured to cause the image display device to display a map based on the map data while comprising: (i) an updating section configured to update the second unit area; (ii) a determining section configured to execute a determination as to whether or not a position separation occurs, after the updating by the updating section, in between a position of the first border node and a position of the second border node; and (iii) a moving section configured to move the positions of the first border node and the second border node to a target point that is on the unit areas border between the first unit area and the second unit area so as to make identical the positions of the first border node and the second border node, based on an affirmative result of the determination by the determining section.

Thus, an amendment is made after the map update so as to move the positions of the first and second border nodes into the identical position. Such a configuration can prevent the road from appearing as if divided because of the position separation or displacement due to the area update, thereby improving the appearance of the map.

According to another example of the present invention, a map update apparatus is provided as follows. An image display device is configured. A storage medium is configured to store map data that is classified into several unit areas, which include a first unit area and a second unit area adjoining the first unit area. Herein, the map data include a planimetric feature, which occupies a geographical area range that bridges over a unit areas border between the first unit area and the second unit area. The planimetric feature is divided by the unit areas border to thereby generate a first border planimetric feature and a second border planimetric feature. The first planimetric feature occupies a portion belonging to the first unit area of the geographical area range, the portion occupied by the first planimetric feature being an inside of a first polygon which is formed by connecting feature points of the first border planimetric feature in a number order. The second planimetric feature occupies a portion belonging to the second unit area of the geographical area range, the portion occupied by the second planimetric feature being an inside of a second polygon which is formed by connecting feature points of the second border planimetric feature in a number order. A control circuit is configured to cause the image display device to display a map based on the map data while comprising: (i) a map display control section configured to display in the image display device a polygon which is formed by connecting feature points of each planimetric feature in the map data; (ii) an updating section configured to update the second unit area; (iii) a determining section configured to execute a determination as to whether or not a position separation is present in between a first border line range and a second border line range by comparing the first border line range and the second border line range after the updating by the updating section, the first border line range being occupied by a line formed by connecting border feature points on the unit areas border with respect to feature points of the first border planimetric feature, the second border line range being occupied by a line formed by connecting border feature points on the unit areas border with respect to feature points of the second border planimetric feature; and (iv) a generating section configured to generate a new planimetric feature which fills in a recess area resulting from the position separation between the first border line range and the second border line range based on an affirmative result of the determination by the determining section. Herein, the new planimetric feature has three vertexes of a first vertex, a second vertex, and a third vertex, as feature points, which are connected to thereby form the recess area of a triangle whose inside is occupied by the new planimetric feature. The first vertex is a first border feature point located on an end point of one of the first border line range and the second border line range, the end point protruding from an other of the first border line range and the second border line range. The second vertex is a second border feature point located on an end point of the other of the first border line range and the second border line range, the end point of the other from which the end point of the one of the first border line range and the second border line range is protruding. The third vertex is a feature point located in one of the first border planimetric feature and the second border planimetric feature to which the second vertex belongs, the third vertex neighboring the second border feature point in a number order, the third vertex being different from a border feature point, which is on the unit areas border between the first unit area and the second unit area.

Thus, a new triangular planimetric feature is prepared. Even if the figuration or graphic form of one planimetric feature is distorted as a result of the area update, a new planimetric feature is prepared and displayed in the image display apparatus such that the occupied area range of the new planimetric feature fills in the recess area resulting from the area update. This can reduce the possibility that the figuration of the planimetric feature looks distorted.

According to another example of the present invention, a method is provided for an area update in map data for a map update apparatus having an image display device and a storage medium storing map data that is classified into several unit areas, which include a first unit area and a second unit area adjoining the first unit area, the first unit area containing a first border node, the second unit area containing a second border node, the first border node and the second border node having an identical position on a unit areas border that is a border between the first unit area and the second unit area. The method comprises: updating the second unit area; determining whether or not a position separation occurs in between a position of the first border node and a position of the second border node after the updating of the second unit area; and moving the positions of the first border node and the second border node to a target point that is on the unit areas border between the first unit area and the second unit area so as to make identical the positions of the first border node and the second border node, based on an affirmative result of the determining.

Relating to the above example, as another example of the present invention, a program product stored in a computer readable medium comprising instructions being executed by a computer is provided, wherein the instructions includes the above method and the method is computer-implemented.

According to yet another example of the present invention, a method is provided for an area update in map data for a map update apparatus having an image display device and a storage medium configured to store map data that is classified into several unit areas, which include a first unit area and a second unit area adjoining the first unit area. Herein, the map data include a planimetric feature, which occupies a geographical area range that bridges over a unit areas border between the first unit area and the second unit area; the planimetric feature is divided by the unit areas border to thereby generate a first border planimetric feature and a second border planimetric feature; the first planimetric feature occupies a portion belonging to the first unit area of the geographical area range, the portion occupied by the first planimetric feature being an inside of a first polygon which is formed by connecting feature points of the first border planimetric feature in a number order; the second planimetric feature occupies a portion belonging to the second unit area of the geographical area range, the portion occupied by the second planimetric feature being an inside of a second polygon which is formed by connecting feature points of the second border planimetric feature in a number order. The method comprising: (i) displaying in the image display device a polygon which is formed by connecting feature points of each planimetric feature in the map data; (ii) updating the second unit area; (iii) determining whether or not a position separation is present in between a first border line range and a second border line range by comparing the first border line range and the second border line range after the updating of the second unit area, the first border line range being occupied by a line formed by connecting border feature points on the unit areas border with respect to feature points of the first border planimetric feature, the second border line range being occupied by a line formed by connecting border feature points on the unit areas border with respect to feature points of the second border planimetric feature; and (iv) generating a new planimetric feature which fills in a recess area resulting from the position separation between the first border line range and the second border line range based on an affirmative result of the determining. Herein the new planimetric feature has three vertexes of a first vertex, a second vertex, and a third vertex, as feature points, which are connected to thereby form the recess area of a triangle whose inside is occupied by the new planimetric feature: the first vertex being a first border feature point located on an end point of one of the first border line range and the second border line range, the end point protruding from an other of the first border line range and the second border line range; the second vertex being a second border feature point located on an end point of the other of the first border line range and the second border line range, the end point of the other from which the end point of the one of the first border line range and the second border line range is protruding; and the third vertex being a feature point located in one of the first border planimetric feature and the second border planimetric feature to which the second vertex belongs, the third vertex neighboring the second border feature point in a number order, the third vertex being different from a border feature point, which is on the unit areas border between the first unit area and the second unit area.

Relating to the above example, as yet another example of the present invention, a program product stored in a computer readable medium comprising instructions being executed by a computer is provided, wherein the instructions includes the above method and the method is computer-implemented.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS (First Embodiment)

Figure 1:
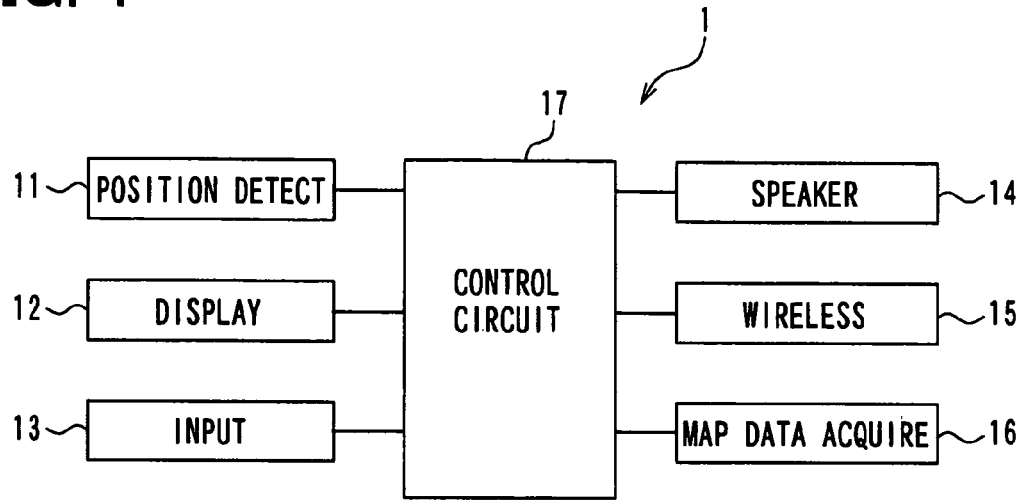
FIG. 1 is a diagram illustrating a configuration of a vehicular navigation apparatus 1 according to a first embodiment of the present invention.

The following describes a first embodiment of the present invention. FIG. 1 illustrates a navigation apparatus 1, which functions as an example of a map update apparatus, for a vehicle according to the first embodiment. The navigation apparatus 1 is mounted in a subject vehicle and includes a position detection device 11, an image display device 12, an input device 13, a speaker 14, a wireless communications device 15, a map data acquisition device 16, and a control circuit 17.

The position detection device 11 includes known sensors or the like such as an acceleration sensor, a geomagnetic sensor, a gyroscope sensor, a speed sensor, and a GPS (Global Positioning System) receiver. The sensors or the like individually output information for designating a present position, travel direction, and speed of the vehicle to the control circuit 17.

The image display device 12 displays images based on video signals outputted from the control circuit 17. For instance, a display image includes a map in vicinity of a present position.

The input device 13 includes such as several mechanical switches arranged in the navigation apparatus 1, and a touch panel overlapped over a display surface of the image display device 12. The input device 13 outputs signals to the control circuit 17 based on depression of the mechanical switch or touch of the touch panel by a user.

The wireless communications device 15 is known as realizing communications with a map distribution server outside of the subject vehicle. The wireless communications device 15 is used for the control circuit 17 to receive map data from the map distribution server.

The map data acquisition device 16 is used for data reading and data writing with a nonvolatile storage medium such as a HDD (Hard Disk Drive). The storage medium stores (i) a program executed by the control circuit 17, (ii) map data for map display and route guidance, or the like.

The map data includes road data and planimetric feature data (i.e., facility data). The road data include link data which is data on links indicating roads connecting intersections and node data which is data on nodes indicating intersections.

The link data include several link records. Each of the link records has one-to-one correspondence with one of several links. One link record corresponding to a certain link contains, as attribution information of the certain link, a link ID; node IDs of the two nodes (a start end node and a terminating end node), which are respectively linked to both the ends of the link; position information (latitude and longitude) on at least one feature point existing between both the start end node and terminating end node; and link type information (such as a highway, local road).

A link ID is a code for identifying a link uniquely, and contains an area element and a specific element. The area element contains an ID of a unit area where the link belongs. The specific element contains an ID for identifying the link uniquely in the unit area. The unit area will be mentioned later. The feature point represents a position which the road corresponding to the link passes through. Therefore, the feature point of the link is information illustrating a figuration (graphic form) or shape on a plan view of the link.

The node data include several node records. Each of the node records has one-to-one correspondence with one of several nodes. A node record corresponding to a certain node contains a node ID and a link ID of a link linked to the certain node as attribution information of the certain node. A node ID is a code for identifying a node uniquely, and contains an area element and a specific element. The area element contains an ID of a unit area where the node belongs. The specific element contains an ID for identifying the node uniquely in the unit area.

Planimetric feature data contains several planimetric feature records. The several planimetric feature records have one-to-one correspondence with several planimetric features, which include man-made feature such as a park and shop, and natural feature such as a river etc. One planimetric feature record corresponding to a certain planimetric feature contains, as attribution information of the certain planimetric feature, a planimetric feature ID, name information, position information (latitude and longitude, or a set of coordinates of latitude and longitude), type information, and polygon data.

A planimetric feature ID is a code for identifying a planimetric feature uniquely, and contains an area element and a specific element. The area element contains an ID of a unit area where the planimetric feature belongs. The specific element contains an ID for identifying the planimetric feature uniquely in the unit area.

The polygon data of a certain planimetric feature is data which defines a geographical area range which the planimetric feature occupies on the map. In, detail, the polygon data has several position information (latitude, longitude) and display color information, with respect to feature points which are arranged in a serial order. When linking the several feature points in the serial order, a polygon is generated. The inside of the polygon becomes the geographical area range which is occupied by the relevant planimetric feature.

It is noted that, in the present embodiment, only a portion of the (total) map data is updated to a new version, which is to be mention later. In detail, out of the total map data, only a geographical area range (e.g., one nation, one state, one prefecture) corresponding to a portion of the map data is updated in respect of road data of roads contained in the geographical area range and planimetric feature data of planimetric features contained in the geographical area range. Such an updating method which updates data of a certain geographical area range out of the total map data is called as an area update (specifically a unit area update).

In order to realize the area update, the map data of the present embodiment is classified or divided into several unit areas. The unit area signifies a geographical area range which is a unit for the area update. The link data and the planimetric feature data do not cross over a border between unit areas (hereinafter referred to as a unit areas border), for example, a nation border, a state border, and a border between prefectures. The link data and planimetric feature data only belong to any one of the several unit areas.

Figure 2:
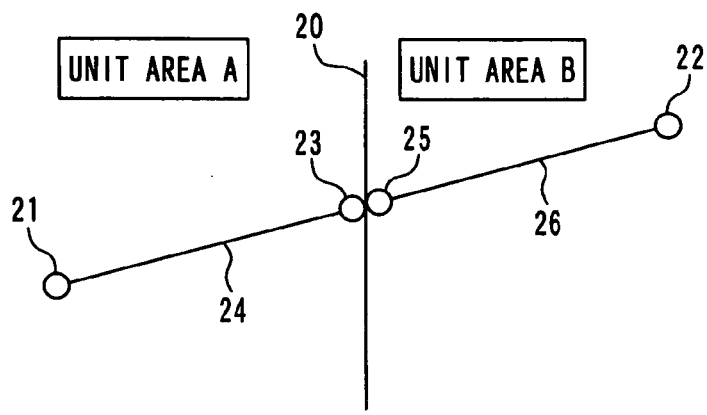
FIG. 2 is a diagram illustrating a configuration of nodes and links when a road crosses a unit areas border.

In detail, node IDs of both the end points of one link record belong to an identical single unit area. This is explained with reference to FIG. 2. In FIG. 2, a node 21 indicating an intersection is contained in a unit area A, whereas a node 22 indicating an intersection is contained in a unit area B adjoining the unit area A. A road exits to connect both the nodes 21, 22 directly (that is, the nodes are connected with each other without passing any other intersection). This road crosses a unit areas border 20 between the unit area A and the unit area B.

With respect to conventional map data, the foregoing road is represented by a single one link; the link record of the link comes to contain, as nodes of both the end points, node IDs of the node 21 and the node 22, which belong to two different unit areas, respectively.

In this regard, however, the present embodiment requires node IDs of both the end points of the link to belong to a single identical unit area. To that end, the road is defined as being divided into the two links 24 and 26 by the unit areas border 20; one link 24 is caused to belong to the unit area A while the other link 26 is caused to belong to the unit area B.

For instance, the area element of the link ID of the link 24 contains an ID of the unit area A; the area element of the link ID of the link 26 contains an ID of the unit area B. Further, a border node 23 located on the unit areas border 20 is provided to be a node of one of both the end points of the link 24 belonging to the unit area A in addition to the node 21. In contrast, a border node 25 located on the unit areas border 20 is provided to be a node of one of both the end points of the link 26 belonging to the unit area B in addition to the node 22.

These border nodes 23 and 25 are in the same position geographically. However, one border node 23 is defined as belonging to the unit area A while the other border node 25 is defined as belonging to the unit area B. That is, although the area element of the node ID of the border node 23 is an ID of the unit area A while the area element of the node ID of the border node 25 is an ID of the unit area B, the position information on the border node 23 and the position information on the border node 25 represent an identical set of a latitude and a longitude (i.e., the same coordinate).

Thus, according to the present embodiment, when a road exists to connect both the nodes 21, 22 of two intersections belonging to respective different mutually adjoining unit areas A, B, of the whole map data, the map data of the unit area A contains not only information on an intersection node 21 but also information on a border node 23 existing on the unit areas border 20. In contrast, of the whole map data, the map data of the unit area B contains not only information on an intersection node 22 but also information on a border node 25 existing on the unit areas border 20. Further, the map data of the unit area A includes information on the link 24 having as both the end points an intersection node 21 and a border node 23. In contrast, the map data of the unit area B includes information on the link 26 having as both the end points an intersection node 22 and a border node 25.

The following explains the contents of the node record of the border nodes 23 and 25 stored as a portion of the node data. Similar to the node indicating an intersection, the node record of each of the border nodes 23 and 25 contains, as an attribute, a node ID of the border node per se, and an link ID of a link connected with the border node per se, and, furthermore, a border flag representing that the border node per se is a border node. In addition, the area element of each node ID of the border nodes 23 and 25 is an ID of the unit area where the border node belongs as mentioned above.

In addition, the contents of the specific elements of the node IDs of the border nodes 23 and 25 are identical to each other. That is, the two border nodes 23 and 25 are generated by dividing a single road at the unit areas border 20 to thereby form a pair. Of the pair, the two border nodes 23, 25 have specific elements identical to each other, exceptionally. Under such a configuration, a border node which serves as an opponent of the pair can be found by comparing the specific elements of the node IDs with each other.

Figure 3:
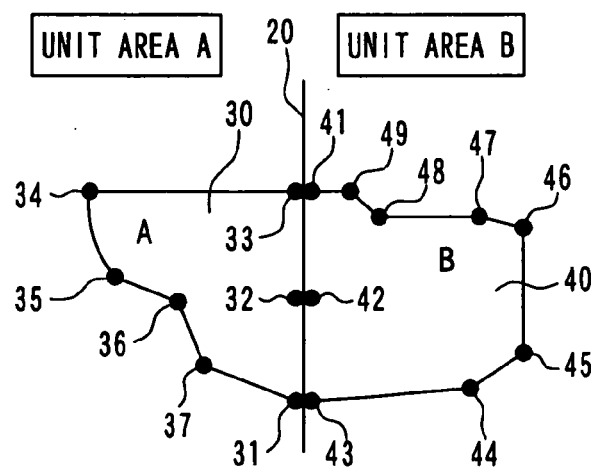
FIG. 3 is a diagram illustrating a configuration of polygon data when a planimetric feature crosses a unit areas border.

The planimetric feature data of the planimetric feature crossing over the unit areas border 20 is explained with reference to FIG. 3. In FIG. 3, the geographical area range occupied by one planimetric feature exists to range over the unit areas border 20 between the unit area A and the unit area B. The occupied area range contains a geographical area range 30 in the unit area A and a geographical area range 40 in the unit area B.

Then, with respect to the map data according to the present embodiment, the planimetric feature data of the single planimetric feature is divided, at the unit areas border 20, into the map data of the two border planimetric features of a single pair. One border planimetric feature 30 is caused to belong to the unit area A while the other border planimetric feature 40 is caused to belong to the unit area B.

In detail, of the geographical area range which the planimetric feature occupies, a geographical area range 30 corresponding to the portion which exists in the unit area A is defined as an occupied area range of a border planimetric feature A contained in the unit area A, whereas a geographical area range 40 corresponding to the portion which exists in the unit area B is defined as an occupied area range of a border planimetric feature B contained in the unit area B.

The contents of the planimetric feature records of the border planimetric feature A and the border planimetric feature B stored as portions of the map data are explained below. The area element of the border planimetric feature ID of the border planimetric feature A contains an ID of the unit area A; the area element of the border planimetric feature ID of the border planimetric feature B contains an ID of the unit area B. That is, the area element of the planimetric feature ID of the border planimetric feature A and the area element of the planimetric feature ID of the border planimetric feature B are the unit area IDs belonging to the respective unit areas, as mentioned above.

In addition, the contents of the specific elements of the border planimetric features A and B are identical to each other. That is, the two border planimetric features A and B are generated by dividing a single planimetric feature by the unit areas border 20 to thereby form a pair. Of the pair, the two border planimetric features A and B have specific elements identical to each other, exceptionally. Under such a configuration, the border planimetric feature which serves as an opponent of the pair can be found by comparing the specific elements of the border planimetric feature IDs with each other.

In addition, the polygon data of the border planimetric feature A has respective position information on the positions (or spots) 31 to 37 surrounding the geographical area range 30 as position information on the feature points. In addition, the polygon data of the border planimetric feature B has respective position information on the positions 41 to 49 surrounding the geographical area range 40 as position information on the feature points. Furthermore, of the feature points 31 to 37, 41 to 49, the feature points 31 to 33 and 41 to 43 existing on the unit areas border 20 between the unit area A and the unit area B are defined as border feature points. The position information on the border feature points 31 to 33 and 41 to 43 are, for example, assigned with border flags so as to distinguish from the feature points 34 to 37, 44 to 49.

In addition, both the contents of the display color information in the polygon data of the border planimetric features A and B are identical to each other. That is, when the polygons of the border planimetric features A and B are displayed in the image display device 12, the display colors of the polygons (color which smears away each polygon or the inside of each polygon) become identical to each other.

According to the above configuration of the map data, the unit area to which the road data and the planimetric feature data belong can be explicitly or clearly differentiated.

The control circuit 17 is a microcomputer including a CPU, RAM, ROM, I/O, etc. The CPU reads a program for operating the navigation apparatus 1 from the ROM or the map data acquisition device 16 to execute it. In the execution, the CPU reads information from the RAM, ROM, and the map data acquisition device 16; writes information to the RAM and the storage medium of the map data acquisition device 16; and communicates data or signals with the position detection device 11, the image display device 12, the input device 13, the speaker 14, and the wireless communications device 15.

The control circuit 17 executes based on programs the following processes: a present position designation process, a map display process, a guidance route calculation process, a route guidance process, a map update process, etc. The present position designation process is to designate a present position and heading direction of the subject vehicle based on signals from the position detection device 11 using a technology such as well-known map matching.

The map display process is to display a map including a specific area such as a vicinity of the present position of the vehicle in the image display device 12. In such a case, information used for displaying the map is acquired from the map data.

In detail, when displaying roads in the image display device 12 in the map display process, the control circuit 17 reads the link data and node data in the road data, specifies the positions of the feature points of the links, the positions of the nodes, and the connection relation of the links and nodes based on the link data and node data, and draws the roads from the nodes to the nodes along the links according to the specified information.

Further, when displaying planimetric features in the image display device 12 in the map display process, the control circuit 17 connects or links the feature points in the polygon data in order, and draws the polygon based on the polygon data in the planimetric feature data, and smears the inside of the polygon with the color according to the display color information in the polygon data.

With respect to the planimetric feature divided along the unit areas border 20 between the unit area A and B, both (i) the polygon, which connects the feature points of the border planimetric feature A contained in the unit area A, and (ii) the polygon, which connects the feature points of the border planimetric feature B contained in the unit area B, are smeared away with the same color in the display. Therefore, the user can see a single planimetric feature, which occupies the area range covering both the polygon of the border planimetric feature A and the polygon of the border planimetric feature B, as actual.

Furthermore, the control circuit 17 functions as a map display control means by executing the map display process.

The guidance route calculation process is to receive an input of a destination by the user via the input device 13, and calculate an optimal guidance route from a present, position to the destination. The route guidance process operates as follows when the subject vehicle approaches a guidance point such as a right/left turn intersection on the guidance route. That is, in the route guidance process, a guidance sound is outputted for directing a right turn, left turn, etc. via the speaker 14, an enlarged view of the guidance point is displayed in the image display device 12. The route guidance process thereby navigates the vehicle along the guidance route. Furthermore, when the vehicle travels in line with the guidance route, how to turn is determined based on the positional relationship between the nodes.

Figure 4:
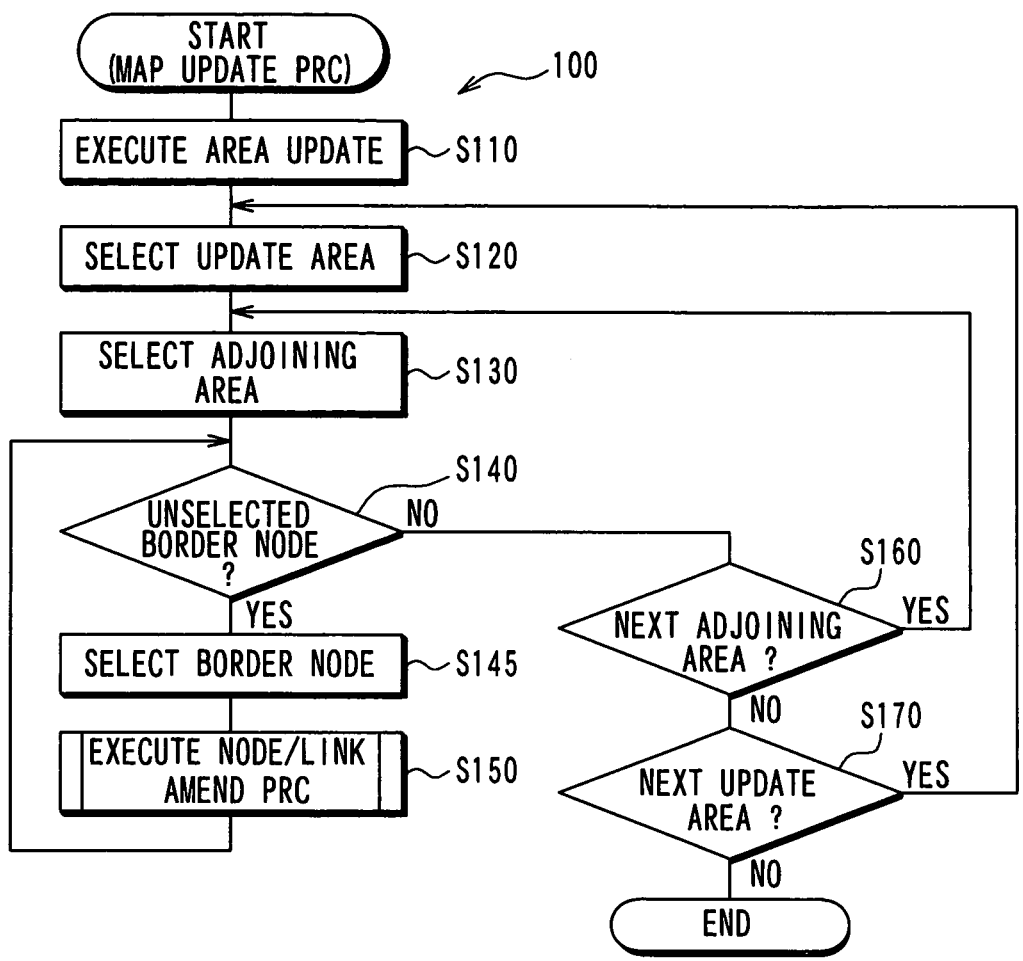
FIG. 4 is a flowchart of a map data update program executed by a control circuit.

In the map update process, a part of the map data is received from the map distribution server outside of the vehicle. An area update is executed based on the received map data. If required, the contents of the link data and node data are amended after the execution of the area update. FIG. 4 is a flowchart of a map data update program 100 executed by the control circuit 17 for the map update process.

It is further noted that a flowchart or the processing of the flowchart in the present application includes sections (also referred to as steps), which are represented, for instance, as S110. Further, each section can be divided into several subsections while several sections can be combined into a single section. Furthermore, each of thus configured sections can be referred to as a means or unit and achieved not only as a software device but also as a hardware device.

Now, the control circuit 17 starts execution of the map update program 100, for example, when a predetermined manipulation for staring an area update is made to the input device 13. At S110, the area update is executed first. In detail, the control circuit 17 requires the map distribution server to send the map data of the new version for update using the wireless communications device 15. At this time, the information which indicates a unit area whose map data is required may be transmitted to the map distribution server. The information indicating the need of the map data of a unit area can be determined based on the user's selection operation to the input device 13.

Upon receiving such a request of the above map data, the map distribution server transmits to the vehicular navigation apparatus 1 only the map data of a predetermined unit area, or only the map data of the unit area corresponding to the received request from the navigation apparatus 1.

Furthermore, the number of unit areas for a transmission target may be one or several.

The control circuit 17 receives via the wireless communications device 15 the map data of the unit area which are transmitted from the map distribution server. With respect to the corresponding unit area, the present map data is replaced by the received map data. For example, the control circuit 17 overwrites the data area storing the map data of the corresponding unit area by using the received map data of the unit area.

Then, at S120, a unit area is selected from the unit areas (update unit areas) which are targets of the above-mentioned map data update, except a unit area having already selected at S120. In other words, an unselected unit area is selected from the update unit areas of the targets of the area update. Then, at S130, a unit area is selected from unit areas (adjoining unit areas) adjoining the update unit area, except a unit area having already selected at S130. In other words, an unselected unit area is selected from the adjoining unit areas.

Then, the following determination is made at S140. That is, it is determined whether any border node, which has not been selected at S140, is contained in the selected adjoining unit areas, which adjoin the presently selected update unit area. If contained, the processing proceeds to S145. If not contained, the processing proceeds to S160.

At S145, a single unselected border node is selected from the border nodes located on the border of the update unit area (i.e., unit areas border) and the adjoining unit area. Then, at S150, a node/link amendment process is executed with respect to the selected border node. The details of the node/link amendment process are mentioned later. S140 is performed again subsequent to S150.

At S160, it is determined whether an unselected adjoining unit area is contained in the adjoining unit areas adjoining the presently selected update unit area. If contained, S130 is executed again. If not contained, S170 is executed. At S170, it is determined whether an unselected update unit area is contained in all the update unit areas. If contained, S120 is executed again. If not contained, the execution of the program 100 is ended.

Thus, according to the execution of the program 100, the control circuit 17 executes the following. That is, the area update is executed with respect to one or more unit areas (refer to S110). Each one of the updated unit areas (update unit area) is selected (see S120 and S170). Each one of the adjoining unit areas adjoining the selected update unit area is selected (see S130 and S160). Any border node contained in the selected adjoining unit area is extracted. The node/link amendment process (see S150) is executed with respect to each of the extracted border nodes (see S140 and S145). Furthermore, a border node which is a target for the node/link amendment process is called a target border node.

Figure 5:
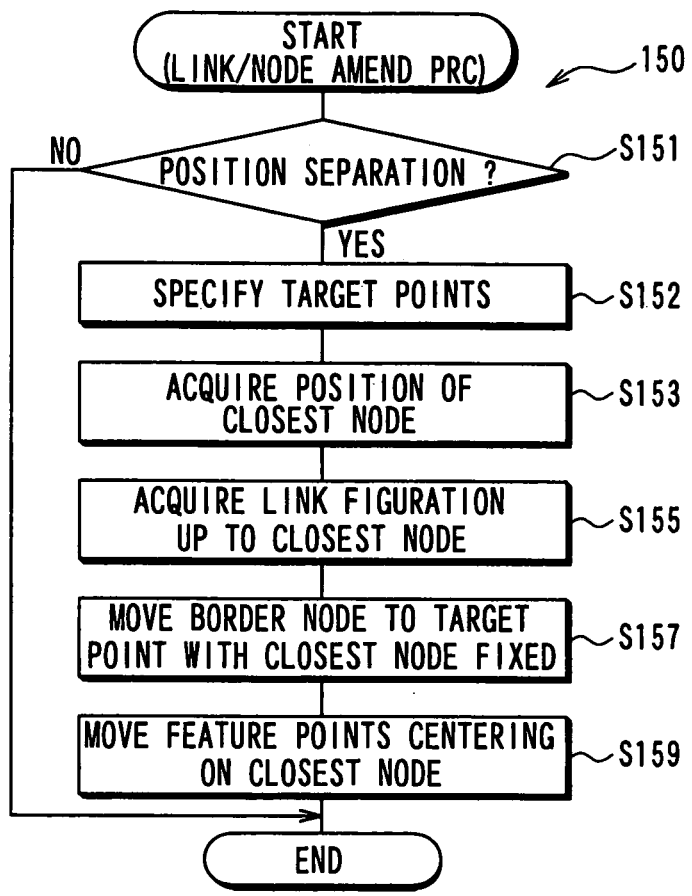
FIG. 5 is a flowchart of a node/link amendment process.
Figure 6:
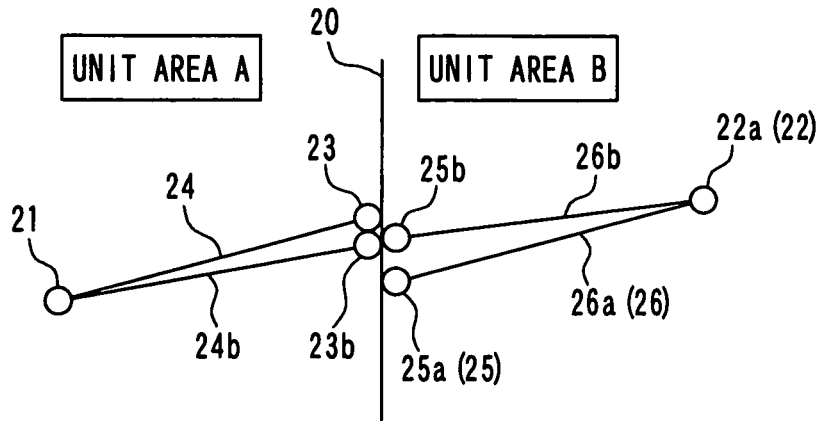
FIG. 6 is a schematic diagram illustrating a node/link amendment process.

The details of the node/link amendment process 150 are explained using the flowchart of FIG. 5 and the schematic diagram of FIG. 6. In the node/link amendment process 150, the control circuit 17 first executes a determination at S151 as to whether a position gap or position separation is found in between the target border node and a pairing border node, which is contained in the update unit area.

Whether a certain border node is pairing with the target border node (i.e., a certain border node is an opponent of the target border node) is determined by determining whether the specific element of the link ID in the node record corresponding to the certain border node is identical to the specific element of the link ID in the node record corresponding to the target border node.

Whether a position separation is found, i.e., whether the positions of the two border nodes are different or identical, is determined based on the position information in the node record corresponding to the target border node, and the position information in the node record corresponding to the pairing or opponent border node.

The example of FIG. 6 illustrates the map data posterior to the area update, which is applied to that of FIG. 2. Posterior to the area update, the unit area A is not updated while the unit area B is updated. As a result, the positions of the intersection node 22 of FIG. 2 and the border node 25 change to the positions 22*a* and the position 25*a*, respectively. With respect to the link 26 of FIG. 2, the positions of the feature points changes after the execution of the area update. As a result, the figuration of the link 26 changes and becomes like the figuration 26*a*. Thus, the positions of the border node 23 and border node 25, which pair with each other on the unit areas border 20, do not accord with each other. That is, the position separation occurs.

When it is determined that the position separation is present, S152 is subsequently executed. In contrast, when it is determined that the position separation is not present, there is no necessity of the amendment to thereby end the node/link amendment process.

At S152, a target point is specified which is present in between the target border node and the opponent border node, both of which configure a pair. The target point is a point which is on the unit areas border between the update unit area and the adjoining unit area and somewhere in between the target border node and the opponent border node.

For example, as indicated in FIG. 6, a target point is on the unit areas border 20 between the update unit area B and the adjoining unit area A, and, furthermore, on the point having an identical distance in a straight line with respect to each of the target border node 23 and the opponent border node 25 (namely, the point corresponding to the positions 23*b* and 25*b*). Furthermore, in FIG. 6, although the display positions of the positions 23*b* and 25*b* are separate from each other, the actual positions of the positions 23*b* and 25*b* are the same.

Then, at S153, two closest nodes are specified. It is noted that a closest node is defined as a node being neighboring or next via the link within the same unit area with respect to each of the pairing two border nodes (i.e., the target border node and the opponent border node). In the example of FIG. 6, the intersection node 21 is a closest node of the target border node 23, whereas the intersection node 22 at the position 22*a* is a closest node of the opponent border node 25.

For instance, a first adjacent link is defined as a link whose one end point is connected with the target border node within the adjoining unit area. A first closest node is defined as a node connected with the other end point of the first adjacent link within the adjoining unit area. A second adjacent link is defined as a link whose one end point is connected with the opponent border node within the update unit area. A second closest node is defined as a node connected with the other end point of the second adjacent link within the update unit area. The positions of the closest nodes are specified based on the position information in the node data.

Then, at S155, the position information on feature points of the adjacent link which connects the border node and the closest node is acquired. With reference to FIG. 6, the position information on feature points of the first adjacent link 24 which connects the target border node 23 and the closest node 21 is acquired, while the position information on feature points of the second adjacent link 26 which connects the opponent border node 25 and the closest node 22 is acquired.

Then, at S157, the positions of the target border node and the opponent border node are moved to the target point determined at S152. In detail, the position information on the node record of the target border node and the position information on the node record of the opponent border node are rewritten so as to accord with the position of the target point.

Furthermore, in this case, the position information on the nodes in the update unit area and the adjoining unit area other than the target border node and the opponent border node is not changed. That is, any node other than the target border node and the opponent border node remains unchanged or fixed. Therefore, the position information on the two closest nodes is not changed, either. That is, the two closest nodes remain unchanged or fixed.

In the example of FIG. 6, according to the above processing, the position of the target border node 23 changes from the original position 23 to the position 23b, whereas the position of the opponent border node 25 changes to the position 25b from the position 25a immediately after the execution of the area update.

Then, at S159, the positions of the feature points of the adjacent links 24, 26 of the mutually pairing border nodes (i.e., the target border node and the opponent border node) are changed. The two-dimensional quantity (for example, the length and direction) of the position change or position movement of the feature points is determined based on the two-dimensional quantity of the position movement of the border node at S157.

Figure 7:
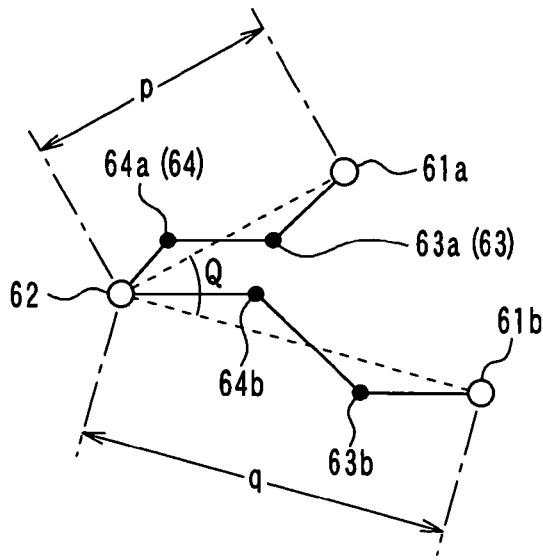
FIG. 7 is a diagram illustrating an example of position movement of feature points.

The determination about the length and direction of the position movement is explained using FIG. 7. It is noted that the position movement of the border node is required from the position 61a to the position 61b. An angle θ (positive in the clockwise rotation) is defined as an angle between the direction from the closest node 62 of the border node to the position 61a, and the direction from the closest node 62 to the position 61b. In addition, a distance p in a straight line is defined as a distance from the closest node 62 to the position 61a. In addition, a distance q in a straight line is defined as a distance from the closest node 62 to the position 61b. According to the foregoing illustration, at S157, the border node is clockwise rotated by the angle θ at the closest node 62 as a rotation center. Further, at S159, the distance from the closest node 62 to the border is changed at the ratio of q/p.

In the above processing, the feature point 63 is clockwise rotated by the angle θ at the closest node 62 as a rotation center from the original position 63a. Furthermore, the distance in a straight line from the closest node 62 to the feature point 63 is changed (expanded or contracted) at the ratio of q/p. Similarly, the feature point 64 is clockwise rotated by the angle θ at the closest node 62 as a rotation center from the original position 64a. Then, the distance in a straight line from the closest node 62 to the feature point 64 is changed (expanded or contracted) at the ratio of q/p. As a result, the position of the feature point 63 is changed from the position 63a to the position 63b. In contrast, the position of the feature point 64 is changed from the position 64a to the position 64b.

A graphic form or figuration is defined as linking several points of a border node (target border node or opponent border node), a corresponding closest node, and intervening feature points. Such graphic forms prior to and posterior to S157 and S159 contain the closest nodes having the same position while having a similarity when being compared with each other.

As explained above, the control circuit 17 of the present embodiment executes the following. Updating the map data of a unit area (update unit area) of the map data. Determining whether a position separation arises in between the opponent border node belonging to the update unit area and the target border node belonging to the adjoining unit area adjacent to the update unit area (refer to S151). Herein, it is noted that the border node is on the unit areas border between the update unit area and the adjoining unit area. Moving the position of the target border node and the position of the opponent border node to the identical single target point (see S152 and S157) so as to match the target border node and the opponent border node with each other.

An amendment is thus made after the execution of the area update so as to move the positions of the target border node and the opponent border node to the identical position. Such a configuration can prevent a single road from being seen disconnected at the unit areas border in the image display device 12 because of the position separation posterior to the area update, thereby improving the appearance of the map.

In addition, in cases that the pairing border nodes do not accord with each other, a route guidance may be mistakenly made. That is, although the actual road figuration at the unit areas border is straight, a right/left turn looks necessary based on the map data, possibly providing the driver with a guidance to urge the left/right turn. In contrast, according to the present embodiment, the pairing border nodes are cause to accord with each other at the unit areas border, thus preventing the left/right turn from being mistakenly announced or provided.

It is noted that the positions of the nodes other than the target border node and the opponent border node are maintained unchanged against the position separation due to the area update. Thus, the position separation amendment process for amending the position separation resulting from the area update affects only a range of the border node and the feature points intervening between the border node and the closest node.

In addition, the positions of the feature points intervening in between the border node and the closest node are rotated and enlarged (expanded)/contracted at the closest node as a rotation center. That is, the positions of the feature points are changed with the rotation center assigned to the closest node by the same rotation angle as the border node and the same expansion-contraction ratio as the border node.

Under such a configuration, the feature points from the border node up to the closest node are changed in a similarity manner with respect to the border node. The position separation or position gap of the nodes can be amended, thereby allowing the user to view the map without the sense of incongruity.

(Second Embodiment)

Figure 8:
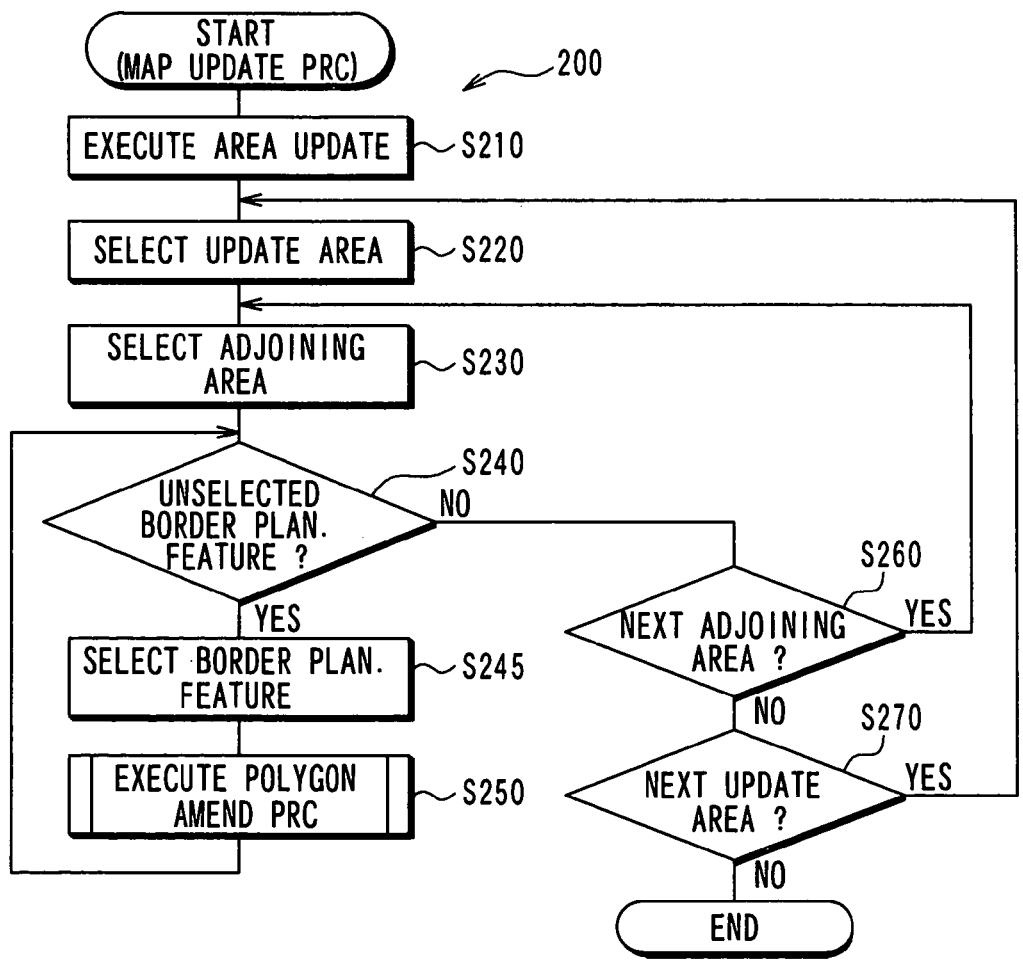
FIG. 8 is a flowchart of a program executed by the control circuit according to a second embodiment of the present invention.

Next, a second embodiment of the present invention is explained while focusing on the different points from the first embodiment. The present second embodiment is different from the first embodiment in respect of a map data update program for the map data updates which the control circuit 17 executes. FIG. 8 illustrates a map data update program 200 executed for the map update process by the vehicular navigation apparatus 1 according to the second embodiment.

In the program 200, the processing contents of S210, S220, S230, S260, and S270 are the same as those of S110, S120, S130, S160, and S170 of the program 100 indicated in FIG. 4, respectively.

At S220, a update unit area is selected. At S230, an adjoining unit area is selected as being adjoining the update unit area selected at S220. At S240, it is determined whether a border planimetric feature, which has not been selected previously at S240, is located on the unit areas border between the update unit area selected at S220 and the adjoining unit area selected at S230. If located, the processing proceeds to S245. If not located, the processing proceeds to S260.

Whether a certain planimetric feature is located on the unit areas border between the update unit area and the adjoining unit area is determined by determining whether the polygon data of the planimetric feature in the planimetric feature data contains a feature point located on the unit areas border between those unit areas. At S245, a single unelected planimetric feature is selected from the planimetric features located on the unit areas border between the update unit area and the adjoining unit area.

According to the execution of the program 200, the control circuit 17 executes the following: executing the area update with respect to one or more unit areas (refer to S210); selecting in a serial order each of the updated unit areas (update unit area) (see S220 and S270); selecting in a serial order each of the adjoining unit areas adjoining the presently selected update unit area (see S230 and S260); selecting in order each of the border planimetric features on the unit areas border between the selected adjoining unit area and the selected update unit area (see S240 and S245); and executing the polygon amendment process with respect to the target of the selected border planimetric feature (refer to S250). It is noted that a border planimetric feature being a target for the polygon amendment process is hereinafter called a target border planimetric feature.

Figure 9:
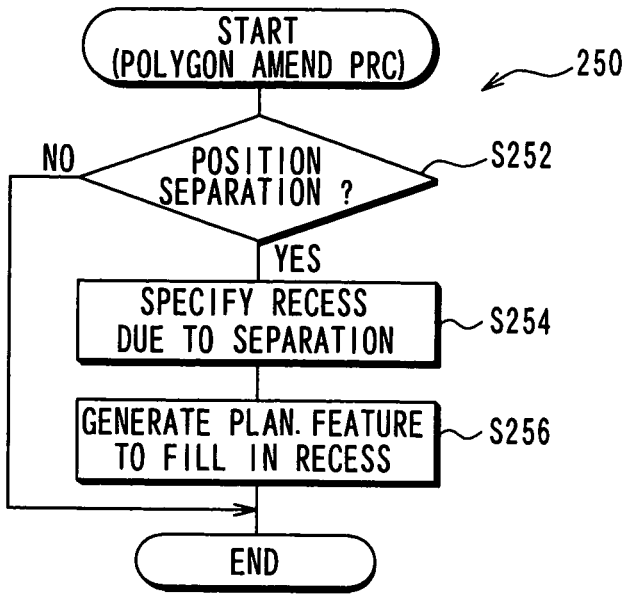
FIG. 9 is a flowchart of a polygon amendment process.
Figure 10:
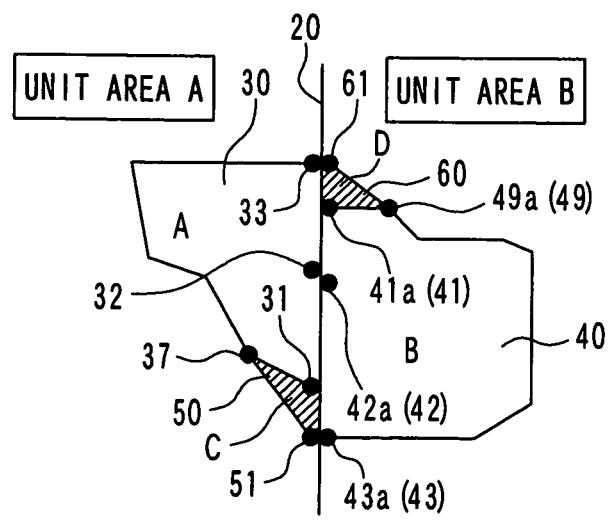
FIG. 10 is a schematic diagram illustrating a polygon amendment process.

The details of the polygon amendment process are explained using the flowchart of FIG. 9 and the schematic diagram of FIG. 10. In the polygon amendment process 250, the control circuit 17 first executes a determination at S252 as to whether a position gap or position separation is found in between a target border planimetric feature and a pairing border planimetric feature (called an opponent border planimetric feature), which is contained in the update unit area.

Whether a position separation is found in between the target border planimetric feature and the opponent border planimetric feature is determined by determining whether the position separation is present in between a line range occupied by the target border planimetric feature on the unit areas border and a line range occupied by the opponent border planimetric feature on the unit areas border.

The details are explained more with reference to FIG. 10. The example of FIG. 10 illustrates the map data posterior to the area update, which is applied to the map data of FIG. 3. By the execution of the area update, the unit area A is not updated while the unit area B is updated. As a result, the positions of the feature points 41, 42, 43, and 49 of the border planimetric feature B of FIG. 3 are changed to the positions 41a, 42a, 43a, and 49a etc., respectively.

At S252, a determination about a position separation posterior to the area update is made by comparing two line ranges as follows. The first line range is defined as a line range from the border feature point 31 to the border feature point 33, both of which are contained in the border feature points 31, 32, 33 of the target border planimetric feature A while being both the end points of the first line range. The second line range 41a to 43a is defined as a line range from the border feature point 41 to the border feature point 43, both of which are contained in the border feature points 41, 42, 43 of the opponent border planimetric feature B while being both the end points of the second line range.

The determination is thus made as to whether a position separation is present in between the first line range 31 to 33 on the unit areas border occupied by the target border planimetric feature A and the second line range 41a to 43a on the unit areas border occupied by the opponent border planimetric feature. When the determination is affirmed, S254 is executed. When the determination is negated, the amendment is unnecessary, thus terminating the polygon amendment process.

In the example of FIG. 10, the first line range 31 to 33 is separated from the second line range 41a to 43a. More specifically, the position of the border node 33 is in a state protruding (or being separated) from the second line range 41a to 43a at one end point on the unit areas border 20, while the position 43a of the border node 43 is in a state protruding (or being separated) from the first line range 31 to 33 at the other end point on the unit areas border 20.

At S254, a recess area range generated by the position separation is specified in the figuration or graphic form of the planimetric feature. The recess area ranges of the figuration of the planimetric feature generated by the position separation are geographical area ranges 50 and 60 illustrated by the slash lines in the example of FIG. 10.

That is, the recess area ranges are delimited as triangles having three vertexes as follows:

(1) A first border feature point (positions 33, 43a in FIG. 10). Herein, a first border line range is defined as connecting border feature points existing on the unit areas border and contained in one border planimetric feature. A second border line range is defined as connecting border feature points existing on the unit areas border and contained in the other border planimetric feature. The first border feature point (positions 33, 43a) is thus defined as existing at an end point protruding (i.e., separated) from an opponent border line range.

(2) A second border feature point (the positions 41a, 31 in FIG. 10). The second border feature point is defined as being at an end point of the opponent line range, the end point from which the first border feature point is protruding.

(3) A feature point (the positions 49a and 37). This feature point is defined as being contained in the polygon data to which the second border feature point belongs while neighboring the second border feature point in the serial order.

If a polygon is configured by linking feature points contained in the polygon data in a number order of an array (i.e., in a serial neighboring order), the display of the polygon appears to have a recess area or to be distorted, contrary to the reality, in the image display device 12 compared with the case of FIG. 3 where the position separation is not present. That is, the appearance of the figuration of the planimetric feature is degraded.

To that end, at S256, a new planimetric feature is generated so as to compensate or fill in the recess area. In detail, the feature points configuring the vertexes of the triangle of the recess area range are designated to define an occupied area range. A planimetric feature record of a new planimetric feature (i.e., a planimetric feature record of the planimetric features C, D in the example of FIG. 10) is generated which has the above defined occupied area range formed by the feature points of the vertexes of the triangle recess area. Further, in the polygon data of the planimetric feature record, the vertexes of the above-mentioned triangle are contained as feature points with display color information, which is common or identical in the polygon data of both the target border planimetric feature and the opponent border planimetric feature. In addition, with respect to a planimetric feature ID of the new planimetric feature, an area element is assigned with an ID of the unit area to which the triangle belongs while a specific element is assigned with an ID different from other planimetric features. In addition, the contents of the other attribution information of the planimetric feature record of the new planimetric feature are the same as those of the planimetric feature record of the target border planimetric feature and the opponent border planimetric feature. The polygon amendment process is terminated after S256.

As explained above, the control circuit 17 of the present embodiment executes the following: updating the map data corresponding to a unit area (update unit area) in the map data; selecting each of the border planimetric features (i.e., limited to the planimetric features located on the border with the update unit area) in the adjoining unit area adjoining the update unit area; determining whether a position separation is present in between the opponent border planimetric feature belonging to the update unit area and the presently selected border planimetric feature in the adjoining unit area (refer to S252); and generating a new planimetric feature (refer to S256) to fill in the recess area, if present, resulting from the position separation (refer to Step 254).

Thus, even if the figuration of one planimetric feature is distorted to cause a recess area as a result of the area update, the record of the new planimetric feature is generated so as to fill in the recess area. The occupied area of the planimetric feature delimited by the polygon data is smeared away in same the display color as that of the original planimetric feature. This can reduce the possibility that the figuration of the planimetric feature looks distorted in the image display device 12.

(Other Embodiments)

While there have been described specific preferred embodiments of the present invention, it is to be distinctly understood that the present invention is not limited thereto and includes various modes capable of embodying functions of specifics of the present invention.

For example, the control circuit 17 can be designed to execute, every execution of the area update, both the node/link amendment process of the first embodiment and the polygon data amendment process of the second embodiment. For that purpose, what is necessary is just to execute and begin the program 200 of FIG. 8 from S220, for example, after executing the program 100 of FIG. 4.

In addition, in the first embodiment, the target point is defined as being at the equal distance from each of the target border node and the opponent border node. Without need of being limited, a target point can be defined as being any point anywhere on the unit areas border in a line range from one border node to the other border node. For example, a target point can be defined as being at the same position as the position of the border node in the update unit area, namely, in the opponent border node.

According to the above embodiment, the control circuit 17 performs the programs to implement the functions. The functions may be achieved by a hardware device having the equivalent functions. Such hardware device examples include an FPGA (Field Programmable Gate Array) capable of programming a configuration of the circuit.

In addition, in the above embodiments, although the navigation apparatus 1 for vehicles is mentioned as an example of a map update apparatus, the map update apparatus according to the present invention does not need to be an in-vehicle apparatus or a navigation apparatus. For example, the map update apparatus according to the present invention can be realized as a cellular phone having map data and a map display function. That is, the technology according to the present invention can be directed to any apparatus which executes a map display based on map data.

As explained in the above, each or any combination of processes, functions, steps, or means explained in the above can be achieved as a software section or unit (e.g., subroutine) and/or a hardware section or unit (e.g., circuit or integrated circuit), including or not including a function of a related device; furthermore, the hardware section or unit can be constructed inside of a microcomputer.

Furthermore, the software section or unit or any combinations of multiple software sections or units can be included in a software program, which can be contained in a computer-readable storage media or can be downloaded and installed in a computer via a communications network.

Aspects of the disclosure described herein are set out in the following clauses.

As a first aspect of the disclosure, a map update apparatus is provided as follows. An image display device is configured. A storage medium is configured to store map data that is classified into several unit areas, which include a first unit area and a second unit area adjoining the first unit area, the first unit area containing a first border node, the second unit area containing a second border node, the first border node and the second border node having an identical position on a unit areas border that is a border between the first unit area and the second unit area. A control circuit is configured to cause the image display device to display a map based on the map data while comprising: (i) an updating section configured to update the second unit area; (ii) a determining section configured to execute a determination as to whether or not a position separation occurs, after the updating by the updating section, in between a position of the first border node and a position of the second border node; and (iii) a moving section configured to move the positions of the first border node and the second border node to a target point that is on the unit areas border between the first unit area and the second unit area so as to make identical the positions of the first border node and the second border node, based on an affirmative result of the determination by the determining section.

Thus, an amendment is made after the map update so as to move the positions of the first and second border nodes into the identical position. Such a configuration can prevent the road from appearing as if being divided because of the position separation or displacement due to the area update, thereby improving the appearance of the map.

As an optional aspect of the disclosure, in the above map update apparatus, when the moving section moves the positions of the first border node and the second border node to the target point on the unit areas border between the first unit area and the second unit area, a position of a node in the map data other than the first border node and the second border node may be maintained unchanged.

Under such a configuration, the amendment of the position separation in the border nodes posterior to the area update does not affect the positions of nodes other than the border nodes.

As an optional aspect of the disclosure, in the above map update apparatus, while moving the positions of the first and second border nodes to the target point, the moving section may be further configured to (i) define (a) a link whose one end point is connected with the first border node within the first unit area as a first adjacent link, that has feature points whose positions indicating a figuration of the first adjacent link and (b) a first closest node connected with an other end point of the first adjacent link as a first rotation center, thereby changing the positions of the feature points of the first adjacent link while centering on the first closest node as the first rotation center, using an rotation angle and an expansion-contraction ratio, both of which are respectively identical to a rotation angle and an expansion-contraction ratio, both of which are used for moving the position of the first border node to the target point, and (ii) define (a) a link whose one end point is connected with the second, border node within the second unit area as a second adjacent link, that has feature points whose positions indicating a figuration of the second adjacent link and (b) a second closest node connected with an other end point of the second adjacent link as a second rotation center, thereby changing the positions of the feature points of the second adjacent link while centering on the second closest node as the second rotation center, using an rotation angle and an expansion-contraction ratio, both of which are respectively identical to a rotation angle and an expansion-contraction ratio, both of which are used for moving the second border node to the target point.

Under such a configuration, the positions of the feature points in a range from the border node up to the closest node are changed in a similarity manner with respect to the border node. The position separation of the nodes can be amended, thereby allowing the user to view the map without the sense of incongruity.

As a second aspect of the disclosure, a map update apparatus is provided as follows. An image display device is configured. A storage medium is configured to store map data that is classified into several unit areas, which include a first unit area and a second unit area adjoining the first unit area. Herein, the map data include a planimetric feature, which occupies a geographical area range that bridges over a unit areas border between the first unit area and the second unit area. The planimetric feature is divided by the unit areas border to thereby generate a first border planimetric feature and a second border planimetric feature. The first planimetric feature occupies a portion belonging to the first unit area of the geographical area range, the portion occupied by the first planimetric feature being an inside of a first polygon which is formed by connecting feature points of the first border planimetric feature in a number order. The second planimetric feature occupies a portion belonging to the second unit area of the geographical area range, the portion occupied by the second planimetric feature being an inside of a second polygon which is formed by connecting feature points of the second border planimetric feature in a number order. A control circuit is configured to cause the image display device to display a map based on the map data while comprising: (i) a map display control section configured to display in the image display device a polygon which is formed by connecting feature points of each planimetric feature in the map data; (ii) an updating section configured to update the second unit area; (iii) a determining section configured to execute a determination as to whether or not a position separation is present in between a first border line range and a second border line range by comparing the first border line range and the second border line range after the updating by the updating section, the first border line range being occupied by a line formed by connecting border feature points on the unit areas border with respect to feature points of the first border planimetric feature, the second border line range being occupied by a line formed by connecting border feature points on the unit areas border with respect to feature points of the second border planimetric feature; and (iv) a generating section configured to generate a new planimetric feature which fills in a recess area resulting from the position separation between the first border line range and the second border line range based on an affirmative result of the determination by the determining section. Herein, the new planimetric feature has three vertexes of a first vertex, a second vertex, and a third vertex, as feature points, which are connected to thereby form the recess area of a triangle whose inside is occupied by the new planimetric feature. The first vertex is a first border feature point located on an end point of one of the first border line range and the second border line range, the end point protruding from an other of the first border line range and the second border line range. The second vertex is a second, border feature point located on an end point of the other of the first border line range and the second border line range, the end point of the other from which the end point of the one of the first border line range and the second border line range is protruding. The third vertex is a feature point located in one of the first border planimetric feature and the second border planimetric feature to which the second vertex belongs, the third vertex neighboring the second border feature point in a number order, the third vertex being different from a border feature point, which is on the unit areas border between the first unit area and the second unit area.

Further, each of the above mentioned first and second aspects of the disclosure can be provided as (i) a method for an area update in map data for the above mentioned map update apparatuses and (ii) a program product stored in a computer readable storage medium comprising instructions for execution by a computer, the instructions including the foregoing method being computer-implemented.

It will be obvious to those skilled in the art that various changes may be made in the above-described embodiments of the present invention. However, the scope of the present invention should be determined by the following claims.

What is claimed:

1. A map update apparatus comprising:
an image display device;
a storage medium configured to store map data that is classified into several unit areas, which include a first unit area and a second unit area adjoining the first unit area, the first unit area containing a first border node, the second unit area containing a second border node, the first border node and the second border node having an identical position on a unit areas border that is a border between the first unit area and the second unit area; and
a control circuit configured to cause the image display device to display a map based on the map data, the control circuit comprising:
an updating section configured to update the second unit area;
a determining section configured to execute a determination as to whether or not a position separation occurs, after the updating by the updating section, in between a position of the first border node and a position of the second border node; and
a moving section configured to move the positions of the first border node and the second border node to a target point that is on the unit areas border between the first unit area and the second unit area so as to make identical the positions of the first border node and the second border node, based on an affirmative result of the determination by the determining section,
wherein:
when the moving section moves the positions of the first border node and the second border node to the target point on the unit areas border between the first area and the second unit area,
a position of a node in the map data other than the first border node and the second border node is maintained unchanged; and
while moving the positions of the first and second border nodes to the target point,
the moving section is further configured to
(i) define
(a) a link whose one end point is connected with the first border node within the first unit area as a first adjacent link, that has feature points whose positions indicate a figuration of the first adjacent link and (b) a first closest node connected with an other end point of the first adjacent link as a first rotation center, and (ii) change the positions of the feature points of the first adjacent link while centering on the first closest node as the first rotation center, using a first rotation angle and a first expansion-contraction ratio, the first rotation angle being identical to a rotation angle defined when the position of the first border node is moved to the target point, the first expansion-contraction ratio being identical to an expansion-contraction ratio defined when the position of the first border node is moved to the target point, and (iii) define
 (a) a link whose one end point is connected with the second border node within the second unit area as a second adjacent link, that has feature points whose positions indicating a figuration of the second adjacent link and
 (b) a second closest node connected with an other end point of the second adjacent link as a second rotation center, and (iv) change the positions of the feature points of the second adjacent link while centering on the second closest node as the second rotation center, using a second rotation angle and a second expansion-contraction ratio, the second rotation angle being identical to a rotation angle defined when the position of the second border node is moved to the target point, the second expansion-contraction ratio being identical to an expansion-contraction ratio defined when the position of the second border node is moved to the target point.

2. The map update apparatus according to claim 1, wherein:
the first rotation angle is an angle formed between a direction from the first closest node to the first border node and a direction from the first closest node to the target point;
the second rotation angle is an angle formed between a direction from the second closest node to the second border node and a direction from the second closest node to the target point;
the first expansion-contraction ratio is a value obtained by dividing a straight-lined distance from the first closest node to the target point by a straight-lined distance from the first closest node to the first border node; and
the second expansion-contraction ratio is a value obtained by dividing a straight-lined distance from the second closest node to the target point by a straight-lined distance from the second closest node to the second border node.

3. The map update apparatus according to claim 2, wherein:
when changing the positions of the feature points of the first adjacent link, the moving section rotates a position of each of the feature points of the first adjacent link at the first closest node as the first rotation center by the first rotation angle while changing an original straight-lined distance from the first closest node to each of the feature points into a straight-lined distance, which is obtained by multiplying the original straight-lined distance from the first closest node to each of the feature points by the first expansion-contraction ratio; and when changing the positions of the feature points of the second adjacent link, the moving section rotates a position of each of the feature points of the second adjacent link at the second closest node as the second rotation center by the second rotation angle while changing an original straight-lined distance from the second closest node to each of the feature points into a straight-lined distance, which is obtained by multiplying the original straight-lined distance from the second closest node to each of the feature points by the second expansion-contraction ratio.

4. The map update apparatus according to claim 3, wherein:
a node record corresponding to the first order node includes a link ID of a link connected to the first border node;
a node record corresponding to the second border node includes a link ID of a link connected to the second border node;
each link ID contains (i) an area element including an ID of a unit area to which each link belongs and (ii) a specific element including an ID to uniquely identify each link;
the determining section
 determines that the first border node and the second border node have the identical position on the unit areas border when the specific element of the link ID in the node record corresponding to the first border node is identical to the specific element of the link ID in the node record corresponding to the second border node, and
 executes the determination as to whether the position separation occurs in between the position of the first border node and the position of the second border node, the first border node and the second border node having been determined to have the identical position.

5. The map update apparatus according to claim 2, wherein:
a node record corresponding to the first border node includes a link ID of a link connected to the first border node;
a node record corresponding to the second border node includes a link ID of a link connected to the second border node;
each link ID contains (i) an area element including an ID of a unit area to which each link belongs and (ii) a specific element including an ID to uniquely identify each link;
the determining section
 determines that the first border node and the second border node have the identical position on the unit areas border when the specific element of the link ID in the node record corresponding to the first border node is identical to the specific element of the link ID in the node record corresponding to the second border node, and
 executes the determination as to whether the position separation occurs in between the position of the first border node and the position of the second border node, the first border node and the second border node having been determined to have the identical position.

6. The map update apparatus according to claim 1, wherein:
a node record corresponding to the first border node includes a link ID of a link connected to the first border node;
a node record corresponding to the second border node includes a link ID of a link connected to the second border node;

each link ID contains (i) an area element including an ID of a unit area to which each link belongs and (ii) a specific element including an ID to uniquely identify each link;

the determining section determines that the first border node and the second border node have the identical position on the unit areas border when the specific element of the link ID in the node record corresponding to the first border node is identical to the specific element of the link ID in the node record corresponding to the second border node, and executes the determination as to whether the position separation occurs in between the position of the first border node and the position of the second border node, the first border node and the second border node having been determined to have the identical position.

7. A map update apparatus comprising:

an image display device;

a storage medium configured to store map data that is classified into several unit areas, which include a first unit area and a second unit area adjoining the first unit area, the map data including a planimetric feature, which occupies a geographical area range that bridges over a unit areas border between the first unit area and the second unit area, the planimetric feature being divided by the unit areas border to thereby generate a first border planimetric feature and a second border planimetric feature, the first planimetric feature occupying a portion belonging to the first unit area of the geographical area range, the portion occupied by the first planimetric feature being an inside of a first polygon which is formed by connecting feature points of the first border planimetric feature in a number order, the second planimetric feature occupying a portion belonging to the second unit area of the geographical area range, the portion occupied by the second planimetric feature being an inside of a second polygon which is formed by connecting feature points of the second border planimetric feature in a number order; and a control circuit configured to cause the image display device to display a map based on the map data, the control circuit comprising:

a map display control section configured to display in the image display device a polygon which is formed by connecting feature points of each planimetric feature in the map data; an updating section configured to update the second unit area;

a determining section configured to execute a determination as to whether or not a position separation is present in between a first border line range and a second border line range by comparing the first border line range and the second border line range after the updating by the updating section, the first border line range being occupied by a line formed by connecting border feature points on the unit areas border with respect to feature points of the first border planimetric feature, the second border line range being occupied by a line formed by connecting border feature points on the unit areas border with respect to feature points of the second border planimetric feature; and a generating section configured to generate a new planimetric feature which fills in a recess area resulting from the position separation between the first border line range and the second border line range based on an affirmative result of the determination by the determining section, wherein the new planimetric feature has three vertexes of a first vertex, a second vertex, and a third vertex, as feature points, which are connected to thereby form the recess area of a triangle whose inside is occupied by the new planimetric feature, the first vertex being a first border feature point located on an end point of one of the first border line range and the second border line range, the end point protruding from an other of the first border line range and the second border line range, the second vertex being a second border feature point located on an end point of the other of the first border line range and the second border line range, the end point of the other from which the end point of the one of the first border line range and the second border line range is protruding, the third vertex being a feature point located in one of the first border planimetric feature and the second border planimetric feature to which the second vertex belongs, the third vertex neighboring the second border feature point in a number order, the third vertex being different from a border feature point, which is on the unit areas border between the first unit area and the second unit area.

8. A method for an area update in map data for a map update apparatus having an image display device and a storage medium storing map data that is classified into several unit areas, which include a first unit area and a second unit area adjoining the first unit area, the first unit area containing a first border node, the second unit area 15, containing a second border node, the first border node and the second border node having an identical position on a unit areas border that is a border between the first unit area and the second unit area, the method comprising:

updating the second unit area;

determining whether or not a position separation occurs in between a position of the first border node and a position of the second border node after the updating of the second unit area; and moving the positions of the first border node and the second border node to a target point that is on the unit areas border between the first unit area and the second unit area so as to make identical the positions of the first border node and the second border node, based on an affirmative result of the determining, wherein:

when the positions of the first border node and the second border node are moved to the target point on the unit areas border between the first unit area and the second unit area, a position of a node in the map data other than the first border node and the second border node is maintained unchanged; and while moving the positions of the first and second border nodes to the target point, the moving is further configured to (i) define (a) a link whose one end point is connected with the first border node within the first unit area as a first adjacent link, that has feature points whose positions indicate a figuration of the first adjacent link and (b) a first closest node connected with an other end point of the first adjacent link as a first rotation center, and (ii) change the positions of the feature points of the first adjacent link while centering on the first closest node as the first rotation center, using a first rotation angle and a first expansion-contraction ratio, the first rotation angle being identical to a rotation angle defined when the position of the first border node is moved to the target point, the first expansion-contraction ratio being identical to an expansion-contraction ratio defined when the position of the first border node is moved to the target point, and (iii) define
(a) a link whose one end point is connected with the second border node within the second unit area as a second adjacent link, that has feature points whose positions indicating a figuration of the second adjacent link and
(b) a second closest node connected with an other end point of the second adjacent link as a second rotation center, and (iv) change the positions of the feature points of the second adjacent link while centering on the second closest node as the second rotation center, using a second rotation angle and a second expansion-contraction ratio, the second rotation angle being identical to a rotation angle defined when the position of the second border node is moved to the target point, the second expansion-contraction ratio being identical to an expansion-contraction ratio defined when the position of the second border node is moved to the target point.

9. A method for an area update in map data for a map update apparatus having an image display device and a storage medium configured to store map data that is classified into several unit areas, which include a first unit area and a second unit area adjoining the first unit area, the map data including a planimetric feature, which occupies a geographical area range that bridges over a unit areas border between the first unit area and the second unit area, the planimetric feature being divided by the unit areas border to thereby generate a first border planimetric feature and a second border planimetric feature, the first planimetric feature occupying a portion belonging to the first unit area of the geographical area range, the portion occupied by the first planimetric feature being an inside of a first polygon which is formed by connecting feature points of the first border planimetric feature in a number order, the second planimetric feature occupying a portion belonging to the second unit area of the geographical area range, the portion occupied by the second planimetric feature being an inside of a second polygon which is formed by connecting feature points of the second border planimetric feature in a number order, the method comprising:

displaying in the image display device a polygon which is formed by connecting feature points of each planimetric feature in the map data;

updating the second unit area;

determining whether or not a position separation is present in between a first border line range and a second border line range by comparing the first border line range and the second border line range after the updating of the second unit area,
the first border line range being occupied by a line formed by connecting border feature points on the unit areas border with respect to feature points of the first border planimetric feature,
the second border line range being occupied, by a line formed by connecting border feature points on the unit areas border with respect to feature points of the second border planimetric feature; and generating a new planimetric feature which fills in a recess area resulting from the position separation between the first border line range and the second border line range based on an affirmative result of the determining, wherein the new planimetric feature has three vertexes of a first vertex; a second vertex, and a third vertex, as feature points, which are connected to thereby form the recess area of a triangle whose inside is occupied by the new planimetric feature,
the first vertex being a first border feature point located on an end point of one of the first border line range and the second border line range, the end point protruding from an other of the first border line range and the second border line range,
the second vertex being a second border feature point located on an end point of the other of the first border line range and the second border line range, the end point of the other from which the end point of the one of the first border line range and the second border line range is protruding, the third vertex being a feature point located in one of the first border planimetric feature and the second border planimetric feature to which the second vertex belongs,
the third vertex neighboring the second border feature point in a number order, the third vertex being different from a border feature point, which is on the unit areas border between the first unit area and the second unit area.

10. A non-transitory computer readable storage medium storing a program product comprising instructions for execution by a computer; the instructions including the method according to claim 8, the method being computer-implemented.

11. A non-transitory computer readable storage medium storing a program product comprising instructions for execution by a computer, the instructions including the method according to claim 9, the method being computer-implemented.

* * * * *